United States Patent [19]
Kress

[11] Patent Number: 5,330,233
[45] Date of Patent: Jul. 19, 1994

[54] RECREATIONAL VEHICLE SEWER APPARATUS

[76] Inventor: James Kress, 550 W. 10th St., Erie, Pa. 16502

[21] Appl. No.: 52,691

[22] Filed: Apr. 27, 1993

[51] Int. Cl.⁵ ............................................. F16L 25/00
[52] U.S. Cl. ................................. 285/9.2; 285/903; 285/415; 248/316.5
[58] Field of Search ............... 285/9.2, 415, 903; 248/316.5, 910; 24/19, 517; 138/96 R, 109, 106

[56] References Cited

U.S. PATENT DOCUMENTS

| | | | |
|---|---|---|---|
| 2,149,394 | 3/1939 | Gardner | 24/517 X |
| 2,911,239 | 11/1959 | Marzolf, Sr. | 285/415 |
| 3,330,354 | 7/1967 | Chamblee | 24/517 X |
| 3,419,942 | 1/1969 | Dunklee | 24/19 |
| 3,730,228 | 5/1973 | Gibbs, Sr. | 138/106 |
| 3,761,114 | 9/1973 | Blakeley | 24/517 X |
| 4,082,242 | 4/1978 | Smith | 248/83 |
| 4,133,347 | 1/1979 | Mercer | 137/344 |
| 4,151,864 | 5/1979 | Thurman | 138/106 |
| 4,223,702 | 9/1980 | Cook | 138/106 |
| 4,228,978 | 10/1980 | Rand | 248/49 |
| 4,412,370 | 11/1983 | Speirs | 24/517 X |
| 4,568,112 | 2/1986 | Bradley, Jr. et al. | 285/415 X |
| 4,660,266 | 4/1987 | Horn | 285/415 X |
| 4,717,048 | 1/1988 | Stenger | 285/415 X |
| 4,796,926 | 1/1989 | Rapsilver | 285/181 |
| 4,921,284 | 5/1990 | Singeethan | 285/415 |
| 5,023,959 | 6/1991 | Mercer | 4/321 |

FOREIGN PATENT DOCUMENTS

| | | | |
|---|---|---|---|
| 0719628 | 3/1980 | U.S.S.R. | 248/316.5 |
| 0602159 | 5/1948 | United Kingdom | 248/316.5 |

Primary Examiner—Randolph A. Reese
Assistant Examiner—Heather Chun
Attorney, Agent, or Firm—Lovercheck and Lovercheck

[57] ABSTRACT

A heavy attachment for attaching to an end of a drain hose of a recreational vehicle is disclosed. The attachment being made up of two half cylindrical shaped halves hinged together which can be pinned in a clamping position around the drain hose adjacent its outlet end with an inch or so of said hose projecting thereby providing an anchor for holding the drain hose in place.

14 Claims, 1 Drawing Sheet

RECREATIONAL VEHICLE SEWER APPARATUS

BACKGROUND OF THE INVENTION

The sewage stored in recreational vehicle (RV) holding tanks are sometimes emptied into dump stations which generally have a four-inch PVC pipe (cemented in a platform) connected to a sewer or a septic system.

When emptying RV holding tanks into a dump station, a three-and-one-half inch vinyl expandable hose is connected to the RV tank outlet. The other end of the hose is inserted loosely into the four-inch PVC pipe. A valve on the RV discharges the sewage through the hose and into the sewage system of the dump station.

A similar application is provided at RV parks. An RV operator pays a fee to park and is provided "full hookup" service. This hookup consists of electrical service, water service and sewer service. The RV operator connects the sewer hose to the sewer system of the RV Park in a similar manner as described for a dump station.

The apprehension of the RV operator, whether hooking up to a dump station or an RV Park facility, is the fear that the sewer hose will disengage from the loose fitting sewer connection and discharge sewage on the ground. There are many systems used for circumventing the disastrous occurrence aforesaid. Some people seek heavy stones to place on top of the hose. Others carry fire logs, cement blocks and bricks to place on top of the hose. There is available a soft rubber adapter cone into which the RV sewer hose is inserted. The device is then inserted into the dump station pipe. However, dumping sewage is a universal problem to everyone employing current methods of holding the sewer hose in the sewer pipe.

Applicant is aware of the following U.S. Pat. Nos.: 3,730,228 to Gibbs for a hose-case assembly. U.S. Pat. No. 4,082,242 to Smith for an omnidirectional sewer hose support. U.S. Pat. No. 4,133,347 to Mercer for a waste evacuation attachment for recreational vehicles. U.S. Pat. No. 4,151,864 to Thurman for a drain adapter for corrugated hose. U.S. Pat. No. 4,223,702 to Cook for a drain line for recreational vehicles. U.S. Pat. No. 4,228,978 to Rand for a recreational vehicle sewer hose support. U.S. Pat. No. 4,796,926 to Rapsilver for a dump fitting for sewer hose. U.S. Pat. No. 5,023,959 to Mercer for an extendable waste hose system. None of the known prior art shows a heavy collar for a hose to hold it in place.

SUMMARY OF INVENTION

Applicant's invention involves a cast iron attachment in the form of a hollow cylinder ring divided into two parts releasably connected together. When opened, the attachment permits easy insertion of a hose. When closed and firmly gripped, the hose cannot dislodge from the attachment. A few inches of the hose may extend beyond the attachment. Applicant's invention assures safe hose protrusion into the PVC sewer pipe. The weight of the cast iron apparatus is approximately eleven pounds, which is more than adequate to hold the hose firmly in the four-inch PVC pipe thus assuring the RV operator of a clean dumping procedure.

It is the object of the invention to provide a weight for a drain for sewage systems.

It is another object of the present invention to provide a sewer hose attachment that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENTS

Figure 1:
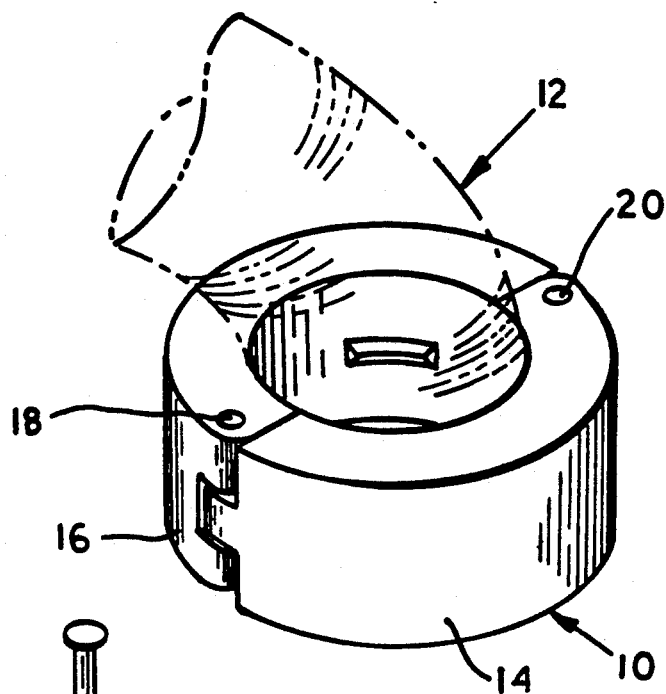
FIG. 1 is an isometric view of a sewer hose attachment in a clamped position on a drain hose according to the invention.
Figure 2:
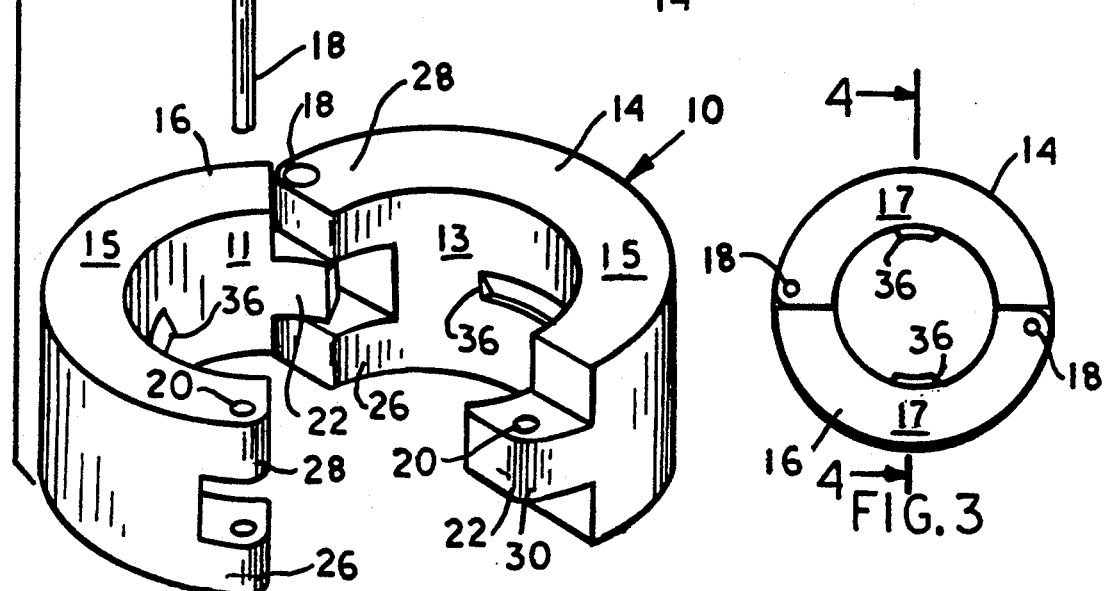
FIG. 2 is an isometric view of the attachment shown in an open position.
Figure 3:
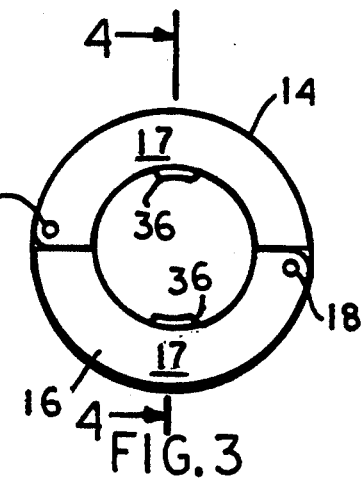
FIG. 3 is a bottom view of the attachment.
Figure 4:
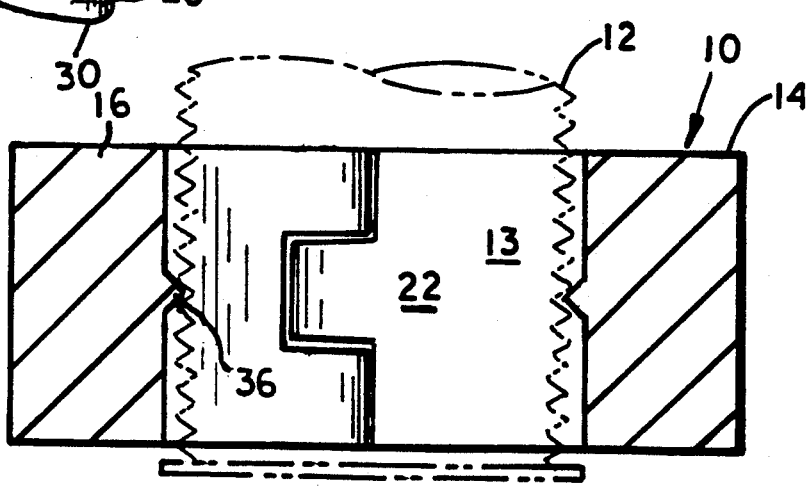
FIG. 4 is a longitudinal cross sectional view taken on line 4—4 of FIG. 3.

Now with more particular reference to the drawings, shown is the attachment having a two-piece cylindrical body 10 for an end of recreation vehicle drain hose 12. Body 10 is made up of first clamping member 14, and second clamping member 16, which are made identical to one another, and swingably connected together by hinge pin be. The two clamping members 14 and 16 being made identical to one another simplifies manufacturing procedures and reduces inventories.

First clamping member 14 has half-cylindrical hose receiving surface 13 and second clamping member 16 has a similar half-cylindrical hose engaging surface 11. Surfaces 11 and 13 together form a cylindrical surface which receives an end part of drain hose 12. First clamping member 14 and second clamping member 16 each have flat top sides 15 and flat bottom sides 17, either of which can rest on a supporting surface.

First clamping member 14 and second clamping member 16 each have a single lug 22 integrally attached to a first end thereof. Spaced lugs 26 and 28 are integrally attached to second ends of first clamping member 14 and second clamping member 16. Single lug 22 is received in the space between spaced lugs 26 and 28 when the attachment is in use. Single lugs 22 and spaced lugs 26,28 all have curved end surfaces 30. Internal lugs 36 are V-shaped in cross section and attached to first and second clamping members 14,16 at an intermediate part of surfaces 11,13 and engage drain hose 12 to hold drain hose 12 positively in position.

Hinge pins 18 are placed through holes 20 holding first clamping member 14 and second clamping member 16 together when the attachment is in use. To remove body 10 from drain hose 12, either of hinge pins 18 is removed from a hole 20 and first clamping member 14 and second clamping member 16 can be swung to either an open or a closed position.

Body 10 may be of sufficient weight to hold drain hose 12 in place without relying on stones, bricks or other extensive weights for anchorage. Body 10 permits easy insertion of an end of a drain hose 12 into a sewer and when closed body 10 firmly grips drain hose 12. An inch or more of drain hose 12 can extend beyond the lower side of body 10 and the extending end can be inserted in an opening in a septic tank to align the drain hose 12 with the opening.

The foregoing specification sets forth the invention in its preferred, practical forms but the structure shown is capable of modification within a range of equivalents without departing from the invention which is to be understood is broadly novel as is commensurate with the appended claims.

I claim:

1. An attachment in combination with an end of a recreation vehicle drain hose comprising;
   a first clamping member and a second clamping member;
   said clamping members together having a weight of about eleven pounds;
   said clamping members having an inside surface and an outside surface; and,
   said clamping members defining a space receiving said drain hose and to support said drain hose on a surface over a sewage receptacle with said drain hose aligned with an opening in said sewage receptacle.

2. The combination recited in claim 1 wherein said attachment has a first end and a second end axially spaced from one another;
   a single lug is fixed to said first end of each said attachment has a first end and a second end axially spaced from one another;
   a single lug is fixed to said first end of each said clamping member and spaced lugs are fixed to said second end of each said clamping member;
   said single lug on each said clamping member is received between said spaced lugs on the other said clamping member; and,
   pin means extending through said spaced lugs and through said single lugs holding said end of said first clamping members and said second clamping member together.

3. An attachment for an end of a recreation vehicle drain hose comprising:
   a first clamping member and a second clamping member;
   said clamping members together having a weight of about eleven pounds;
   said clamping members being adapted to receive said drain hose of said recreation vehicle between them and to support said drain hose on a surface over a sewage receptacle with said drain hose aligned with an opening to said sewage receptacle;
   a single lug is fixed to a first end of each said clamping member and spaced lugs are fixed to a second end of each said clamping member;
   said single lug one each said clamping member is received in a space between said spaced lugs on the other said clamping member;
   a pin means extending through said spaced lugs and through said single lugs holding said first clamping member and said second clamping member together with said drain hose therebetween; and,
   said first clamping member has an internal lug adjacent said second clamping member to grip said drain hose.

4. The combination recited in claim 1 wherein said clamping members are identical to one another.

5. The combination recited in claim 1 wherein said attachment is clamped around said drain hose with an end of said hose extending to an opening in said sewage receptacle.

6. An attachment for an end of a recreation vehicle drain hose comprising;
   a first clamping member and a second clamping member;
   said clamping members together having a weight of about eleven pounds;
   said clamping members being adapted to receive said drain hose of said recreation vehicle between them and to support said drain hose on a surface over a sewage receptacle with said drain hose aligned with an opening to said sewage receptacle;
   each said clamping members having a first end and a second end;
   a single lug is fixed to said first end of each said clamping member and spaced lugs are fixed to said second end of each said clamping member;
   said single lug on each said clamping member is received in a space between said spaced lugs on the other said clamping member;
   a pin means extending through said spaced lugs and through said single lugs holding said first clamping member and said second clamping member together; said first clamping member has an internal lug adjacent said second clamping member to grip said drain hose; and,
   said first clamping member and said second clamping member each having at least one flat side to rest on a top of said sewage receptacle.

7. In combination a drain hose for a recreational vehicle and an attachment for said drain hose comprising said hose and a first clamping member and a second clamping member;
   hinge means connecting said first clamping member to said second clamping member;
   fastening means on said first clamping member and on said second clamping member spaced from said hinge means for connecting said first clamping member to said second clamping member;
   said drain hose being disposed between said clamping members; and,
   said attachment having sufficient weight to hold an end of said drain hose in position over a sewage receptacle.

8. The combination recited in claim 7 wherein said attachment is made of a material relatively heavy to water.

9. The combination recited in claim 7 wherein said attachment is made of a material having a density at least as great as iron.

10. The combination recited in claim 9 wherein said first clamping member and said second clamping member each have a half cylindrical surface adapted to engage said drain hose;
    an internal lug on at least one of said surfaces;
    said internal lug being adapted to engage an outside surface of said drain hose and to hold said drain hose in position.

11. The combination recited in claim 7 wherein said first clamping member and said second clamping member each have two spaced lugs on a second end thereof and a single lug on a first end thereof;
    said single lug on said first clamping member being received between said spaced lugs on said second clamping member;
    said single lug on said second clamping member being received between said spaced lugs on said first clamping member;

said spaced lugs and said single lugs each having a hole therein;

a pin extending through said hole in said spaced lugs on said first clamping member and through said single lug on said second clamping member;

a pin extending through said hole in said spaced lugs in said second clamping member and through said single lug on said first clamping member holding said first clamping member and said second clamping member together to receive said drain hose therebetween.

12. The combination recited in claim 7 wherein said first clamping member and said second clamping member are substantially identical to each other.

13. The attachment recited in claim 10 wherein said first clamping member and said second clamping member of said attachment have flat side adapted to rest on a flat surface of a sewage receptacle.

14. In combination, a recreation vehicle drain hose and attachments for said drain hose comprising;

a first clamping member and a second clamping member;

each said clamping member having a substantially half cylindrical outer surface and a substantially cylindrical inner surface substantially concentric to said outer surface;

said clamping members each having a first end and a second end axially spaced from one another;

fastening means on each said ends of each said clamping members for fastening said ends of each said clamping members together around said drain hose; and, said clamping members having a weight sufficient to hold an end of said drain hose in position over an opening to a sewer system.

* * * * *